(12) United States Patent
Kim et al.

(10) Patent No.: US 10,588,474 B2
(45) Date of Patent: Mar. 17, 2020

(54) ROBOT CLEANER

(71) Applicant: LG ELECTRONICS INC., Seoul (KR)

(72) Inventors: Bongju Kim, Seoul (KR); Jihoon Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 15/742,730

(22) PCT Filed: Jun. 30, 2016

(86) PCT No.: PCT/KR2016/007030
§ 371 (c)(1),
(2) Date: Jan. 8, 2018

(87) PCT Pub. No.: WO2017/014440
PCT Pub. Date: Jan. 26, 2017

(65) Prior Publication Data
US 2018/0206687 A1  Jul. 26, 2018

(30) Foreign Application Priority Data
Jul. 17, 2015  (KR) .......................... 10-2015-0101681

(51) Int. Cl.
*A47L 9/28* (2006.01)
*G05D 1/02* (2006.01)
(Continued)

(52) U.S. Cl.
CPC .............. *A47L 9/2889* (2013.01); *A47L 9/009* (2013.01); *A47L 9/28* (2013.01); *A47L 9/2852* (2013.01);
(Continued)

(58) Field of Classification Search
CPC ...... G01S 17/08; G01S 17/023; G01S 7/4813; A47L 9/2889; A47L 9/28; A47L 9/2852; A47L 9/009; A47L 2201/06; A47L 9/1683; A47L 2201/04; G05D 1/0242; G05D 2201/0215
See application file for complete search history.

(56) References Cited

U.S. PATENT DOCUMENTS

2005/0022485 A1  2/2005  Park et al.
2012/0089253 A1  4/2012  Li et al.
(Continued)

FOREIGN PATENT DOCUMENTS

DE  10-2011-054706  9/2012
GB  2404438  2/2005
(Continued)

OTHER PUBLICATIONS

European Search Report dated Feb. 15, 2019 issued in Application No. 16827944.6.
(Continued)

*Primary Examiner* — David Redding
(74) *Attorney, Agent, or Firm* — Ked & Associates, LLP

(57) ABSTRACT

A robot cleaner is disclosed. The robot cleaner includes a main body, a suction device provided inside the main body, a suction port for sucking foreign substances upon operation of the suction device, a dust collection device for collecting foreign substances from air sucked through the suction port, one or more wheels for enabling the main body to travel autonomously, and a control unit for controlling operation of the suction device and the wheels. The main body includes an upper housing and a lower housing, which are coupled to each other, and a side body interposed between the upper housing and the lower housing to surround a side portion of the main body. One or more obstacle sensors are mounted to the side body. One or more sensor covers are removably mounted to the side body at positions corresponding to the one or more obstacle sensors.

19 Claims, 4 Drawing Sheets

(51) Int. Cl.
  *A47L 9/00* (2006.01)
  *G01S 7/481* (2006.01)
  *G01S 17/02* (2006.01)
  *G01S 17/08* (2006.01)
  *A47L 9/16* (2006.01)

(52) U.S. Cl.
  CPC .......... *G01S 7/4813* (2013.01); *G01S 17/023* (2013.01); *G01S 17/08* (2013.01); *G05D 1/0242* (2013.01); *A47L 9/1683* (2013.01); *A47L 2201/04* (2013.01); *A47L 2201/06* (2013.01); *G05D 2201/0215* (2013.01)

(56) References Cited

U.S. PATENT DOCUMENTS

| | | |
|---|---|---|
| 2013/0331990 A1 | 12/2013 | Jeong et al. |
| 2014/0257565 A1 | 9/2014 | Sun et al. |
| 2014/0288709 A1 | 9/2014 | Sim et al. |

FOREIGN PATENT DOCUMENTS

| | | |
|---|---|---|
| JP | 2003-323214 | 11/2003 |
| JP | 2011-518367 | 6/2011 |
| JP | 2011-220938 | 11/2011 |
| JP | 2014-094289 | 5/2014 |
| JP | 2014-204984 | 10/2014 |
| JP | 2014-208271 | 11/2014 |
| KR | 10-2013-0020062 | 2/2013 |
| KR | 10-2014-0109178 | 9/2014 |
| TW | 200948333 | 12/2009 |

OTHER PUBLICATIONS

International Search Report and Written Opinion dated Oct. 18, 2016 issued in Application No. PCT/KR2016/007030 (Full English Text).

Taiwanese Office Action dated Jun. 14, 2017 issued in Application No. 105122068 (with English translation).

[Fig. 1]
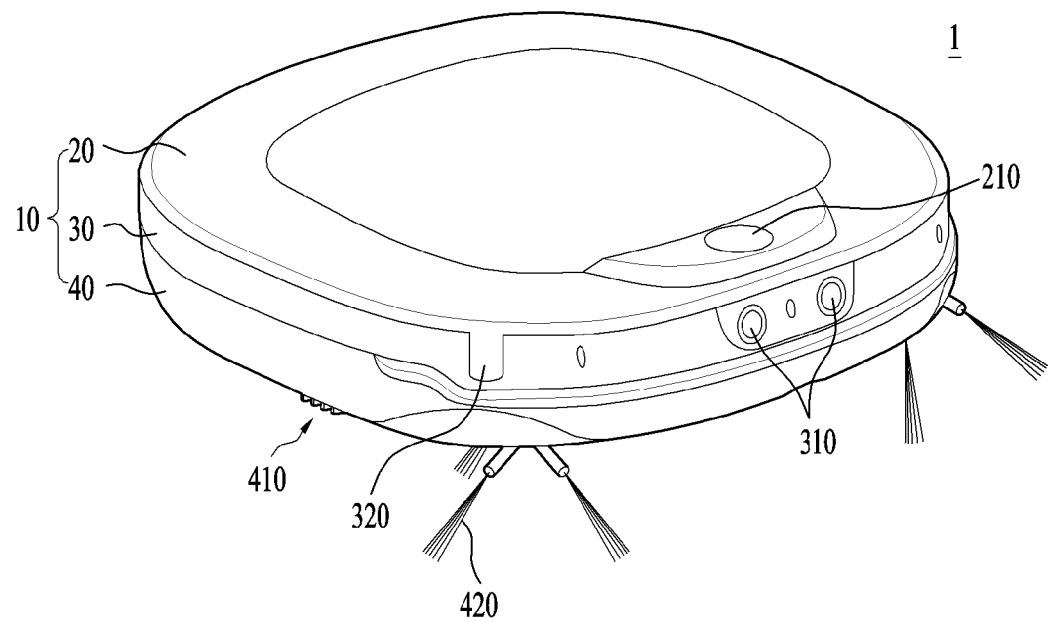
[Fig. 2]
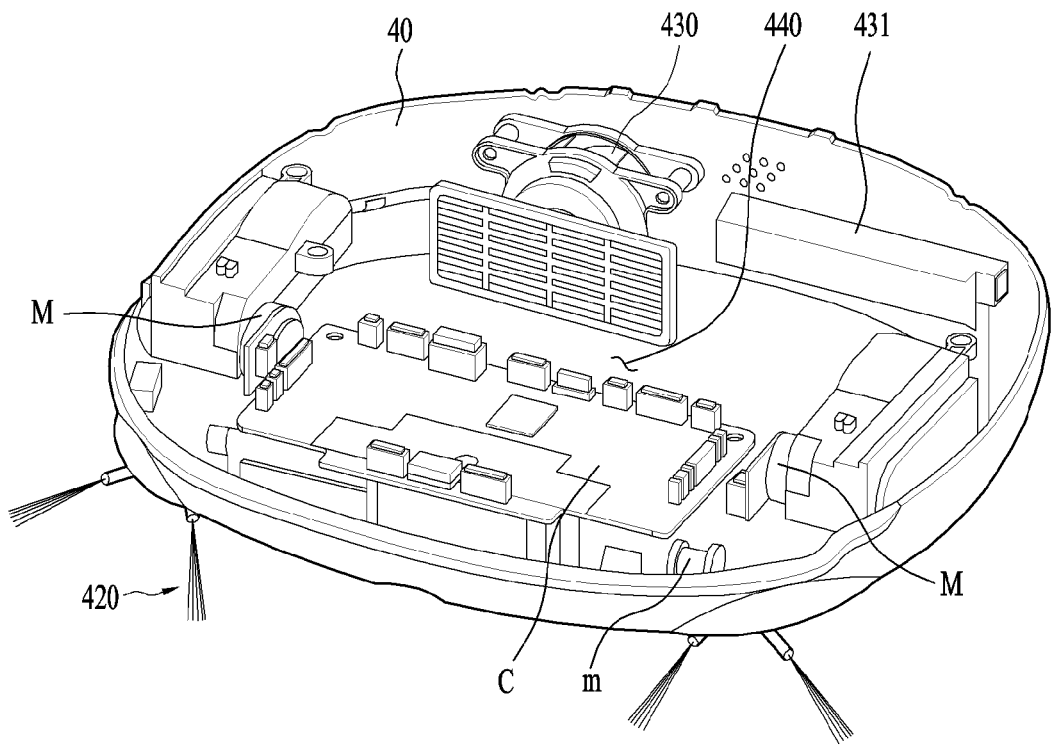

[Fig. 3]
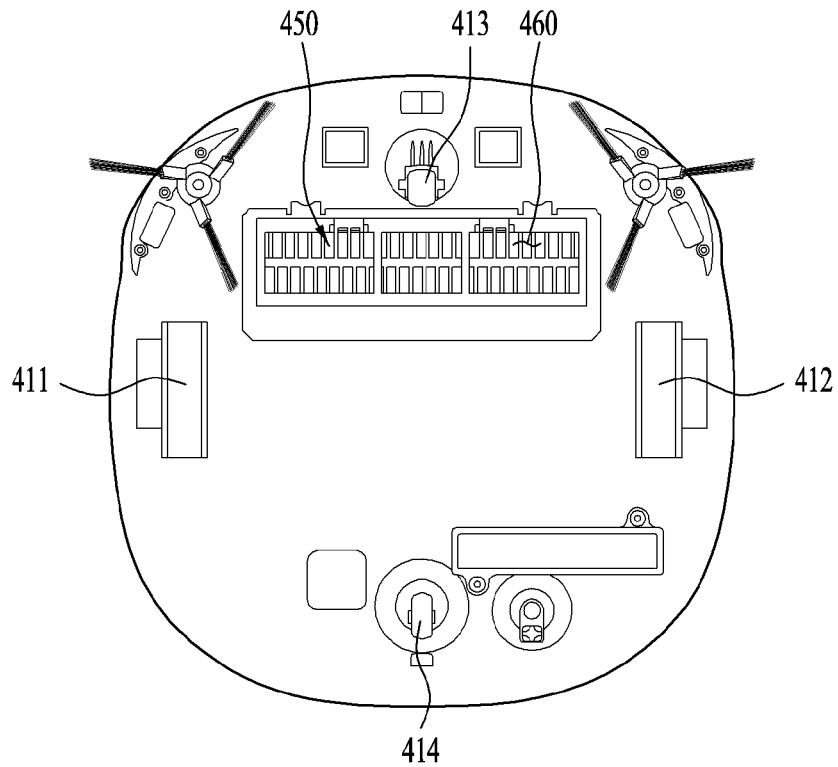
[Fig. 4]
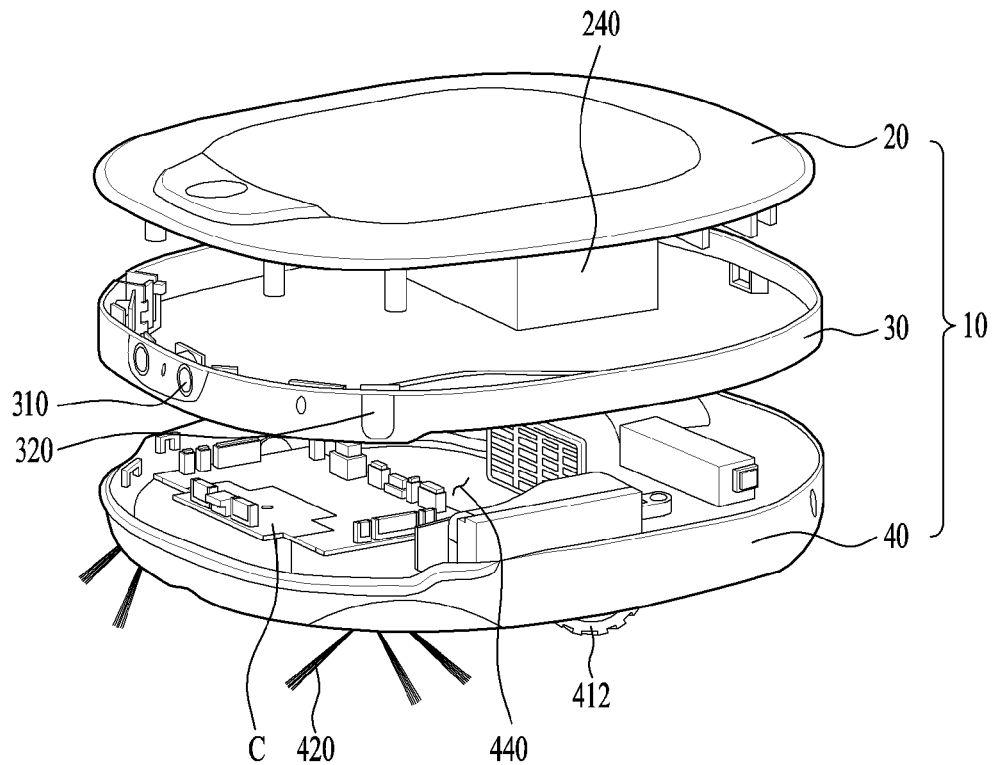

[Fig. 5]
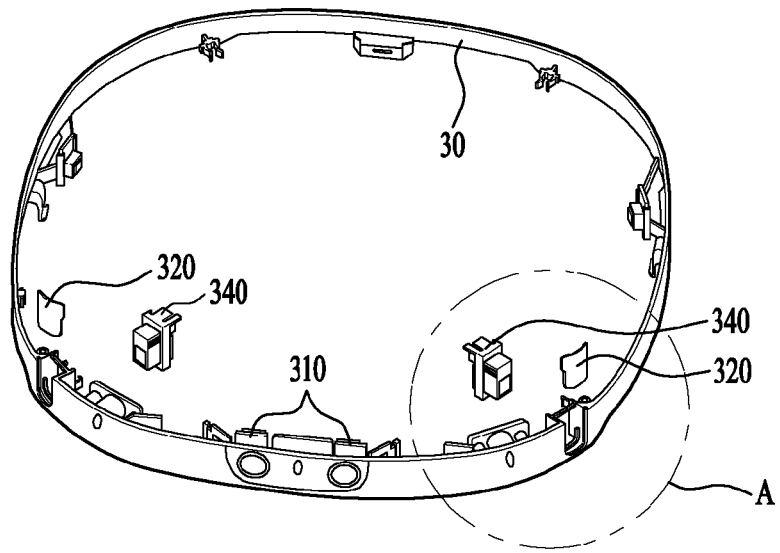
[Fig. 6]
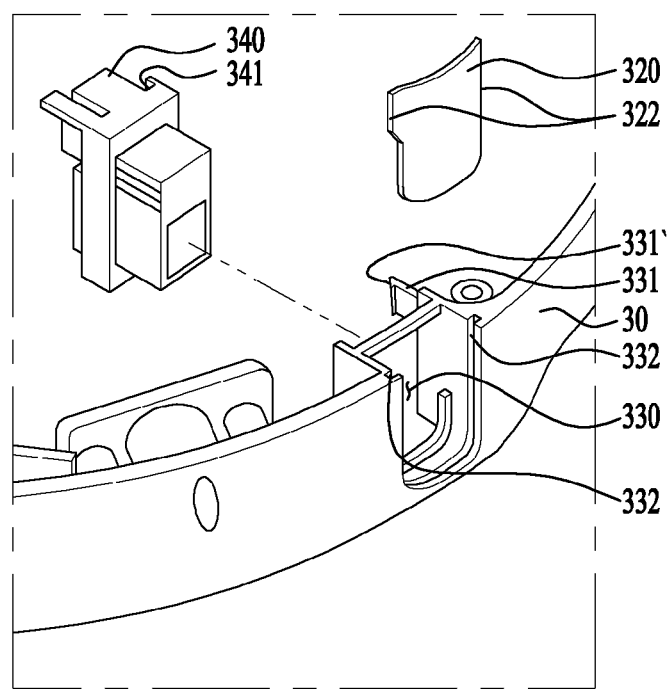

[Fig. 7]
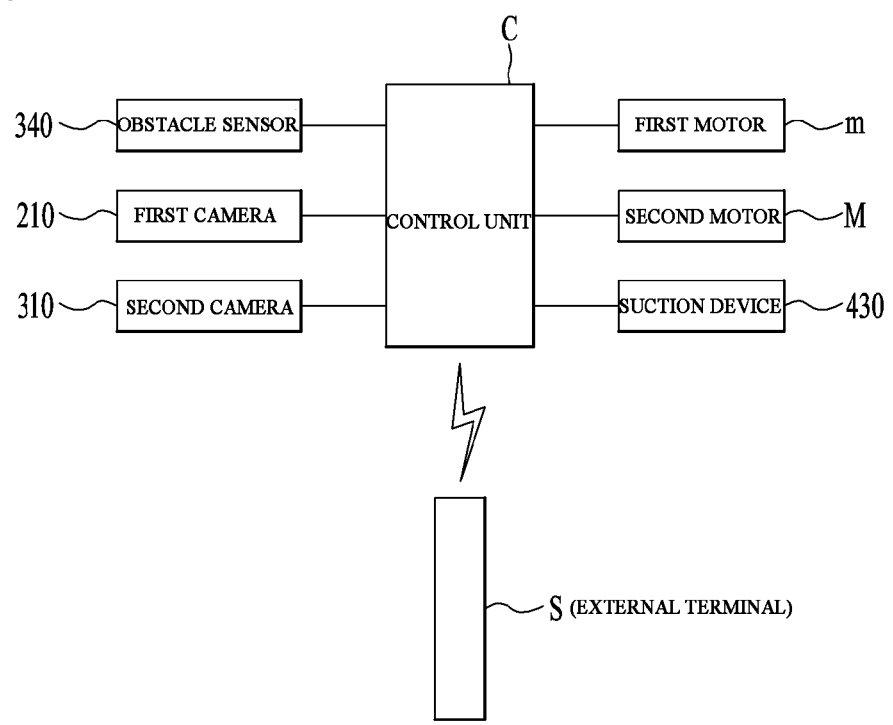

ROBOT CLEANER

CROSS-REFERENCE TO RELATED PATENT APPLICATIONS

This application is a U.S. National Stage Application under 35 U.S.C. § 371 of PCT Application No. PCT/KR2016/007030, filed Jun. 30, 2016, which claims priority to Korean Patent Application No. 10-2015-0101681, filed Jul. 17, 2015, whose entire disclosures are hereby incorporated by reference.

TECHNICAL FIELD

The present invention relates to a robot cleaner, and more particularly, to a robot cleaner that is capable of preventing an obstacle sensor from malfunctioning and improving the precision of obstacle detection.

BACKGROUND ART

In general, a vacuum cleaner is an appliance for cleaning floors, carpets placed on floors, or the like by sucking air containing foreign substances using an air suction device, which includes a motor and a fan mounted inside the main body of the cleaner in order to generate air suction force, removing and collecting the foreign substances from the sucked air, and discharging purified air, from which the foreign substances have been removed, outside the main body of the cleaner.

Such a vacuum cleaner may be classified into a manual vacuum cleaner, which is directly manipulated by a user, and a robot cleaner, which performs cleaning autonomously without a user's manipulation.

The robot cleaner autonomously travels in an area to be cleaned, and sucks foreign substances such as, for example, dust from the floor. In addition, the robot cleaner may include various sensors (for example, an obstacle sensor) in order to avoid obstacles or walls located within the working area.

The obstacle sensor may be configured to emit infrared light and receive the infrared light reflected from an object, thereby measuring the distance to obstacles or walls located ahead of the sensor. That is, the obstacle sensor may include an infrared sensor.

For instance, the infrared sensor may include a light-emitting unit (a transmission unit) and a light-receiving unit (a reception unit), and may enable measurement of the distance between the infrared sensor and an obstacle located ahead of the infrared sensor using the time taken for the infrared light emitted from the light-emitting unit to be received by the light-receiving unit after being reflected from the obstacle.

The obstacle sensor is exposed to direct solar radiation, which progresses toward the obstacle sensor from outside the robot cleaner.

However, if the obstacle sensor receives direct solar radiation (for example, visible light) other than the light emitted from the light-emitting unit of the infrared sensor, there is a high probability of the obstacle sensor malfunctioning.

In order to solve this problem, it may be considered to form the outer surface of the robot cleaner, which covers the obstacle sensor, using a material that allows only infrared light to pass therethrough. However, there is a problem in that such a material, which allows only infrared light to pass therethrough, is more expensive than a commonly used plastic material.

Further, if the material that allows only infrared light to pass therethrough is scratched, there is a problem in that the obstacle sensor cannot accurately receive the light (that is, infrared light) incident thereon.

In other words, a scratch formed on the surface of a material that allows only infrared light to pass therethrough may cause a malfunction of the obstacle sensor.

DISCLOSURE OF INVENTION

Technical Problem

An object of the present invention devised to solve the problem lies on a robot cleaner, which includes a sensor cover that is capable of allowing only infrared light of direct solar radiation incident thereon from outside the robot cleaner to pass therethrough.

Another object of the present invention devised to solve the problem lies on a robot cleaner, in which the sensor cover, which allows only infrared light to pass therethrough, is disposed in front of the obstacle sensor, thereby preventing the obstacle sensor from malfunctioning.

A further object of the present invention devised to solve the problem lies on a robot cleaner, in which the sensor cover is formed to have a size corresponding to the size of the obstacle sensor, thereby reducing manufacturing costs.

Another further object of the present invention devised to solve the problem lies on a robot cleaner, in which the sensor cover is removably mounted to a main body of the robot cleaner, thereby facilitating maintenance of the sensor cover.

Still another further object of the present invention devised to solve the problem lies on a robot cleaner, which is capable of preventing scratches from being formed on the surface of the sensor cover through UV coating treatment of the surface of the sensor cover and suitable arrangement of the sensor cover.

Solution to Problem

The object of the present invention can be achieved by providing a robot cleaner including a main body defining an outer appearance thereof, a suction device provided inside the main body, a suction port for sucking foreign substances on a floor upon operation of the suction device, a dust collection device for collecting foreign substances from air sucked through the suction port, one or more wheels for enabling the main body to travel autonomously, and a control unit for controlling operation of the suction device and the wheels, in which the main body includes an upper housing and a lower housing, which are coupled to each other, and a side body interposed between the upper housing and the lower housing to surround a side portion of the main body, one or more obstacle sensors are mounted to the side body, and one or more sensor covers are removably mounted to the side body at positions corresponding to the one or more obstacle sensors.

Each of the sensor covers may be formed to have a size sufficient to cover a front surface of a corresponding one of the obstacle sensors.

Each of the sensor covers may have a height less than or equal to a height of the side body, and may have a width less than or equal to one-twentieth of a circumference of the side body.

The side body and the sensor covers may be formed of different materials from each other.

The side body and the sensor covers may be manufactured separately, and the sensor covers may be removably mounted to the side body at positions in front of the obstacle sensors.

The side body may be mounted with one or more camera modules, which face a region ahead of the robot cleaner, and the side body may be formed of a semi-transparent material.

Each of the obstacle sensors may include an infrared sensor, and the sensor covers may be formed to block light other than infrared light.

The sensor covers may be formed of polycarbonate.

At least one surface of each of the sensor covers may be treated with UV coating.

Alternatively, all surfaces of each of the sensor covers may be treated with UV coating.

The side body may have openings formed therein, each of which is located at a position corresponding to a corresponding one of the obstacle sensors and a corresponding one of the sensor covers, and each of the obstacle sensors may emit and receive a signal for detecting external obstacles through a corresponding one of the openings and a corresponding one of the sensor covers.

The side body may be formed in a hollow ring shape having open top and bottom ends and a predetermined height.

A distance between a center in a radial direction of the side body and an outer surface of the side body may be larger than a distance between the center in the radial direction of the side body and an outer surface of each of the sensor covers.

Each of the sensor covers may be arranged to be stepped inwards from the outer surface of the side body in the radial direction of the side body.

The side body may include first coupling portions for coupling the obstacle sensors thereto, and second coupling portions for coupling the sensor covers thereto, and the second coupling portions may be formed in the side body at positions further radially outward than the first coupling portions.

Each of the first coupling portions may have a coupling protrusion, and each of the obstacle sensors may have a coupling recess, into which the coupling protrusion is fitted, and each of the sensor covers may be removably coupled to a corresponding one of the second coupling portions in a slide-coupling manner.

Each of the second coupling portions may be formed in a slit shape extending in a vertical direction, and each of the sensor covers may have an edge portion formed in at least one of two opposite side surfaces in a width direction of the sensor cover, the edge portion being inserted into a corresponding one of the second coupling portions.

Advantageous Effects of Invention

According to the present invention, a robot cleaner may include a sensor cover that is capable of allowing only infrared light of direct solar radiation incident thereon from outside the robot cleaner to pass therethrough.

In addition, according to the present invention, the sensor cover allowing only infrared light to pass therethrough may be disposed in front of the obstacle sensor, thereby preventing the obstacle sensor from malfunctioning.

In addition, according to the present invention, the sensor cover may be formed to have a size corresponding to the size of the obstacle sensor, thereby reducing manufacturing costs.

In addition, according to the present invention, the sensor cover may be removably mounted to a main body of the robot cleaner, thereby facilitating maintenance of the sensor cover.

In addition, according to the present invention, the robot cleaner may be capable of preventing scratches from being formed on the surface of the sensor cover through UV coating treatment of the surface of the sensor cover and suitable arrangement of the sensor cover.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 illustrates a perspective view of a robot cleaner according to an embodiment of the present invention;

FIG. 2 illustrates a view of the internal constitution of the robot cleaner according to the embodiment of the present invention;

FIG. 3 illustrates a view of the bottom of the robot cleaner according to the embodiment of the present invention;

FIG. 4 illustrates an exploded perspective view of the robot cleaner according to the embodiment of the present invention;

FIG. 5 illustrates a perspective view of a side body of the robot cleaner according to the embodiment of the present invention;

FIG. 6 illustrates an enlarged view of portion A in FIG. 5; and

FIG. 7 illustrates a block diagram of components connected with a control unit of the present invention.

MODE FOR THE INVENTION

Hereinafter, a robot cleaner according to one embodiment of the present invention will be described in detail with reference to the accompanying drawings. It is to be understood that the accompanying drawings which illustrate the exemplary configuration of the present invention is merely given for more detailed description of the present invention and is not intended to limit the technical scope of the present invention.

In addition, the same or similar elements are denoted by the same reference numerals even though they are depicted in different drawings and a repeated description thereof will be omitted. For convenience of description, in the drawings, sizes and shapes of respective constituent members may be exaggerated or reduced.

FIG. 1 illustrates a perspective view of a robot cleaner according to an embodiment of the present invention, FIG. 2 illustrates a view of the internal constitution of the robot cleaner according to the embodiment of the present invention, FIG. 3 illustrates a view of the bottom of the robot cleaner according to the embodiment of the present invention, and FIG. 4 illustrates an exploded perspective view of the robot cleaner according to the embodiment of the present invention.

Referring to FIGS. 1 to 4, a robot cleaner 1 according to an embodiment of the present invention may include a main body 10 defining the outer appearance thereof, a suction device 430 provided inside the main body, a suction port 460 formed to suck foreign substances from a floor upon operation of the suction device 430, a dust collection device 240 (refer to FIG. 4) for collecting foreign substances from the air sucked through the suction port 460, one or more wheels 411, 412, 413 and 414 provided to enable the main body 10 to travel, and a control unit C configured to control the operation of the suction device 430 and the one or more wheels 411, 412, 413 and 414.

The main body 10 may include an upper housing 20 and a lower housing 40, which are formed to be coupled to each other, and may further include a side body 30, which is interposed between the upper housing 20 and the lower housing 40.

As an example, the main body 10 may be formed such that the overall width is greater than the overall height. When viewed from above, the main body 10 may be formed to have a substantially circular shape or a substantially rectangular shape having rounded corners.

The main body 10 according to the present invention may have four corners, each of which is rounded with a predetermined radius of curvature. In addition, the main body 10 may have a front edge, a rear edge, and two side edges extending therebetween, each of which is rounded with a predetermined radius of curvature. The radius of curvature of each edge may be greater than the radius of curvature of each corner.

A first camera 210, for capturing images of the region above the robot cleaner 1, may be mounted to the upper housing 20. The first camera 210 may be configured to capture images of the ceiling. Based on the images of the ceiling captured by the first camera 210, the control unit C may detect the current position of the robot cleaner 1, which will be described later.

Since technologies related to detection of the position of the robot cleaner 1 through image capture are already well known in the art, a detailed explanation thereof will be omitted.

The suction device 430 may include a motor (not illustrated) and a blade (not illustrated). Foreign substances on the floor may be drawn into the main body 10 upon operation of the suction device 430.

The suction port 460 may be formed to suck foreign substances from the floor into the main body upon operation of the suction device 430. That is, the suction port 460 may serve as an introduction port, through which external air and foreign substances are introduced into the main body 10.

As an example, the suction port 460 may be formed in the bottom surface of the main body 10. More particularly, the suction port 460 may be formed in the bottom surface of the lower housing 40. In addition, the suction port 460 may be located at a position ahead of the suction device 430. Accordingly, when the suction device 430 operates, foreign substances on the floor may be introduced into the main body 10 through the suction port 460.

A battery 431, for supplying electric power to the suction device 430, may be provided inside the main body 10.

The dust collection device 240 (refer to FIG. 4) may be configured to collect foreign substances from the air sucked through the suction port 460. That is, when the external air and foreign substances on the floor are sucked together through the suction port 460 by the operation of the suction device 430, the dust collection device 240 may collect the foreign substances.

As an example, the dust collection device 240 may be disposed between the suction port 460 and the suction device 430. In addition, the dust collection device 240 may be formed to allow the suction port 460 and the suction device 430 to communicate with each other. Further, the dust collection device 240 may include a filter (not illustrated).

Accordingly, the air introduced into the main body through the suction port 460 may pass sequentially through the dust collection device 240 and the suction device 430, and may be then discharged outside. During this process, foreign substances included in the air may be collected in the dust collection device 240.

In the embodiment of the present invention, the dust collection device 240 may be removably mounted to the bottom surface of the upper housing 20. In addition, the lower housing 40 may be formed with a space 440 for accommodating the dust collection device 240 therein.

Therefore, when the upper housing 20 and the lower housing 40 are coupled to each other, the dust collection device 240 may be accommodated in the space 440 formed in the lower housing 40.

A first brush assembly 450 (refer to FIG. 3) may be provided at a position corresponding to the suction port 460 inside the main body 10. For example, the first brush assembly 450 may include a rotating shaft and a plurality of brushes provided on the circumference of the rotating shaft.

The rotating shaft of the first brush assembly 450 may be arranged to extend in the width direction of the main body 10, and the brushes may be arranged to extend outward from the circumference of the rotating shaft in the radial direction of the rotating shaft. Accordingly, foreign substances on the floor may be gathered by rotation of the first brush assembly 450, and may thus be easily sucked into the suction port 460.

A first motor m, for rotating the first brush assembly 450, may be provided inside the main body 10. The first brush assembly 450 may be rotated by operation of the first motor m, which is controlled by the control unit C.

In the embodiment of the present invention, both the first brush assembly 450 and the first motor m may be mounted to the lower housing 40.

In addition, one or more second brush assemblies 420 may be provided at a lower portion of the main body 10. As an example, the second brush assemblies 420 may be mounted to the bottom surface of the lower housing 40, and may be spaced apart from each other in the width direction of the main body. In addition, the second brush assemblies 420 may be disposed at a front portion of the bottom surface of the lower housing 40.

The second brush assemblies 420 may be rotated simultaneously with the first brush assembly 450 by rotation of the first motor m. To this end, the driving force from the first motor m may also be transmitted to the second brush assemblies 420 via a connection member such as, for example, helical gears.

The one or more wheels 411, 412, 413 and 414 may include two driving wheels 411 and 412 and two auxiliary wheels 413 and 414.

The driving wheels 411 and 412 may include a right wheel 411 and a left wheel 412, which are spaced apart from each other in the width direction of the main body 10. The auxiliary wheels 413 and 414 may include a front wheel 413 and a rear wheel 414, which are spaced apart from each other in the anterior-posterior direction of the main body 10.

As an example, the one or more wheels 411, 412, 413 and 414 may be formed to protrude downward from the bottom surface of the lower housing 40.

In particular, the two driving wheels 411 and 412 may be respectively connected to second motors M. That is, the right wheel 411 and the left wheel 412 may be respectively connected to each of two second motors M, which are controlled by the control unit C.

When only any one of the right wheel 411 and the left wheel 412 is driven, the robot cleaner 1 may rotate.

For example, when only the second motor M connected to the right wheel 411 is driven, the robot cleaner 1 may rotate to the left. Conversely, when only the second motor M connected to the left wheel 412 is driven, the robot cleaner 1 may rotate to the right.

Although not connected to separate motors, the two auxiliary wheels 413 and 414 may serve to support the movement of the robot cleaner 1 upon operation of the driving wheels 411 and 412.

One or more second cameras 310 may be mounted to the side body 30. As an example, the one or more second cameras 310 may be mounted to the inner surface of the side body 30.

Here, the inner surface of the side body 30 may be a surface facing the interior of the main body 10, and the outer surface of the side body 30 may be a surface facing the exterior of the main body 10.

In addition, the second cameras 310 may be configured to capture images of the region ahead of the robot cleaner 1. The images captured by the second cameras 310 may be transmitted to an external terminal (not illustrated), such as, for example, a smartphone.

In particular, the control unit C may include a communication module (not illustrated), which is configured to communicate with an external terminal, and the images captured by the second cameras 310 may be transmitted to an external terminal through the communication module of the control unit C.

The second cameras 310 may capture images of the region ahead of the robot cleaner 1 through the side body 30. Accordingly, the side body 30 may be formed of a semi-transparent material.

The purpose of this is to enable the second cameras 310 to capture images of the region ahead of the robot cleaner 1, and also to make the interior of the robot cleaner 1 invisible through the side body 30.

The side body 30 may be formed to surround a side portion of the main body 10, and one or more obstacle sensors 340 (refer to FIG. 5) may be mounted to the side body 30, which will be described later.

The obstacle sensors 340 may be mounted to the inner surface of the side body 30.

In addition, one or more sensor covers 320 may be removably mounted to the side body 30, and may be located at positions corresponding to the one or more obstacle sensors 340.

The sensor covers 320 may be removably mounted to the side body 30, and may be located in front of the respective obstacle sensors 340.

That is, each of the sensor covers 320 may be formed to cover the front surface of a corresponding obstacle sensor 340 while being located at a position corresponding to the corresponding obstacle sensor.

At this time, each of the sensor covers 320 and the front surface of the corresponding obstacle sensor 340 may be spaced a predetermined distance apart from each other.

Therefore, the obstacle sensors 340 may be protected by the sensor covers 320. In addition, maintenance and repair of the sensor covers 320 may be easily and con-veniently achieved.

In an example, in the case in which the sensor covers 320 are not separately provided, the obstacle sensors 340 may be covered by the side body 30. However, if portions of the side body 30 that correspond to the positions of the obstacle sensors 340 are damaged, for example, scratched, it is probable that the obstacle sensors 340 will malfunction.

Therefore, when it is intended to prevent such malfunction of the obstacle sensors 340, there may occur a problem in that the whole side body 30 must be replaced.

However, the present invention is characterized in that the sensor covers 320, which are located at positions corresponding to the obstacle sensors 340, are removably mounted to the side body 30. Accordingly, the present invention has an advantage in that, even when the sensor covers 320 are scratched, malfunction of the obstacle sensors 340 can be prevented merely by replacing the sensor covers 320.

Hereinafter, the sensor covers 320 of the robot cleaner 1 according to the embodiment of the present invention will be explained in more detail with reference to other drawings.

FIG. 5 illustrates a perspective view of the side body of the robot cleaner according to the embodiment of the present invention.

Referring to FIG. 5, the robot cleaner 1 according to the embodiment of the present invention may include one or more obstacle sensors 340 and one or more sensor covers 320, which are located at positions corresponding to the respective obstacle sensors 340.

As an example, in the embodiment illustrated in FIG. 5, two obstacle sensors 340 and two sensor covers 320 corresponding to the respective obstacle sensors 340 may be disposed at two front corner portions of the side body 30. Accordingly, the two obstacle sensors 340 may detect obstacles located in the range of about 120 degrees to about 180 degrees ahead of the robot cleaner 1.

The obstacle sensors 340 and the sensor covers 320 may be removably mounted to the above-described side body 30.

The sensor covers 320 may be removably mounted to portions of the side body 30 that correspond to the positions of the respective obstacle sensors 340 so as to cover the front surfaces of the respective obstacle sensors 340. At this time, the sensor covers 320 may be mounted to the side body 30 such that the sensor covers 320 are spaced a predetermined distance apart from the front surfaces of the respective obstacle sensors 340.

The sensor covers 320 may serve to protect the obstacle sensors 340 from external shocks, and may also make the obstacle sensors 340 invisible from the outside.

Each of the sensor covers 320 may be formed to have a size suitable for shielding the front surface of a corresponding obstacle sensor 340. This facilitates manufacture and replacement of the sensor covers 320, which will be described later.

That is, each of the sensor covers 320 may be formed to be as small as possible so long as it can sufficiently cover the front surface of a corresponding obstacle sensor 340. Accordingly, when the sensor cover 320 is damaged, for example, scratched, a user may remove the scratched sensor cover 320 from the side body 30, and may easily replace it with a new sensor cover.

As an example, each of the sensor covers 320 may have a height less than or equal to the height of the side body 30. In addition, each of the sensor covers 320 may have a width less than or equal to one-twentieth of the circumference of the side body 30. Preferably, the width of each of the sensor covers 320 may be one-twentieth to one-fiftieth of the circumference of the side body 30.

As such, because the width of each of the sensor covers 320 is much less than the circumference of the side body 30, the scratched sensor cover 320 may be easily replaced, and accordingly the replacement cost may be reduced. In addition, easy replacement of the sensor covers 320 may lead to prevention of malfunction of the obstacle sensors 340.

The side body 30 and the sensor covers 320 may be formed of different materials from each other.

In detail, the side body 30 is formed to cover the front surface of the second cameras 310 for capturing images of the region ahead of the robot cleaner 1. That is, the second cameras 310 may be mounted to the inner surface of the side body 30 so as to capture images of the region ahead of the robot cleaner 1.

Therefore, the side body 30 needs to be formed of a transparent material or a semi-transparent material. In the embodiment of the present invention, the side body 30 may be formed of a semi-transparent material. For example, the side body 30 may be formed of a semi-transparent plastic material.

In other words, the side body 30 may support the second cameras 310 so that the second cameras 310 can be mounted thereto, and may also protect the second cameras 310 from external shocks. In addition, the side body 30 may make the interior of the robot cleaner 1 invisible from the outside.

Unlike this, the sensor covers 320 need to be formed of a material that allows only infrared light to pass therethrough, in order to prevent malfunction of the obstacle sensors 340. For example, the sensor covers 320 may be formed of polycarbonate, which admits only infrared light of direct solar radiation.

In other words, the material used for the sensor covers 320 is more expensive than the material used for the side body 30. Accordingly, if the side body 30 is formed of a semi-transparent plastic material and only the sensor covers 320 are formed of polycarbonate, the manufacturing costs may be reduced further than in the case of the constitution in which the whole side body 30 is formed of polycarbonate.

In addition, as described above, because the material of the side body 30 and the material of the sensor covers 320 are different from each other, it is preferable to manufacture the side body 30 and the sensor covers 320 separately.

In other words, after the side body 30 and the sensor covers 320 are manufactured separately, the sensor covers 320 may be removably mounted to the side body 30 at positions in front of the obstacle sensors 340.

Therefore, manufacturing costs may be reduced, maintenance of the sensor covers 320 may be facilitated, and malfunction of the obstacle sensors 340 may be easily prevented.

Hereinafter, the coupling structure of the sensor covers 320 and the obstacle sensors 340 to the side body 30 and the features of the sensor covers 320 will be explained in more detail with reference to other drawings.

FIG. 6 illustrates an enlarged view of portion A in FIG. 5.

Referring to FIGS. 5 and 6, each of the above-described obstacle sensors 340 may include a light-emitting unit and a light-receiving unit so as to measure the distance to obstacles located ahead of the sensor. For example, each of the obstacle sensors 340 may include an infrared sensor.

The light-emitting unit may emit infrared light toward the region ahead of the robot cleaner, the light-receiving unit may receive the infrared light reflected from an obstacle, and the distance between the infrared sensor and the obstacle may be measured based on the time taken for the infrared light emitted from the light-emitting unit to be received by the light-receiving unit.

At this time, if the light-receiving unit receives light (for example, visible light) other than infrared light, there is a high probability of the obstacle sensor 340 malfunctioning.

Therefore, it is necessary to prevent light other than infrared light from being introduced into the light-receiving unit of the obstacle sensors 340.

The sensor covers 320 according to the embodiment of the present invention may be formed to block light other than infrared light. That is, the sensor covers 320 may be formed to block direct solar radiation, such as visible light, other than infrared light.

Accordingly, such sensor covers 320 may prevent malfunction of the obstacle sensors 340 attributable to the introduction of light other than infrared light into the light-receiving unit of the obstacle sensors 340.

In particular, the sensor covers 320 may be formed of polycarbonate. In other words, the sensor covers 320 made of polycarbonate may be removably mounted to the side body 30 made of a semi-transparent plastic material.

The unit price of polycarbonate is higher than that of commonly used semi-transparent plastic, but polycarbonate may serve to easily block light other than infrared light.

By mounting the sensor covers 320 of polycarbonate only to relatively small regions of the side body 30, which correspond to positions in front of the obstacle sensors 340, manufacturing costs may be reduced and malfunction of the obstacle sensors 340 may be prevented.

Meanwhile, if the sensor covers 320 are scratched, there may occur a problem in that the obstacle sensors 340 malfunction due to the scratching.

In order to minimize scratching on the sensor covers 320, at least one surface of each of the sensor covers 320 may be treated with UV coating.

For instance, the surface of each of the sensor covers 320 that is exposed to the outside of the robot cleaner 1 may be treated with UV coating.

Such UV coating treatment may improve the scratch resistance and abrasion resistance of the sensor covers 320, and may also prevent the obstacle sensors 340 from malfunctioning.

Alternatively, all surfaces of each of the sensor covers 320 may be treated with UV coating. That is, both the front surface and the rear surface of each of the sensor covers 320 may be treated with UV coating.

As an example, each of the sensor covers 320 may be formed such that the front surface and the rear surface are symmetrical with each other. This may lead to improvement in efficiency of mounting the sensor covers 320 to the side body 30.

In other words, if each of the sensor covers 320 is formed such that the front surface and the rear surface are symmetrical with each other, there is an advantage in that the sensor covers 320 can be easily mounted to the side body 30 without considering the mounting direction.

In order to maintain the advantage of improving the scratch resistance without considering the orientation at which the sensor covers 320 are mounted to the side body 30, it is preferable to treat all surfaces of the sensor covers 320 with UV coating.

As such, if all surfaces of the sensor covers 320 are treated with UV coating, the scratch resistance of the sensor covers 320 may be improved irrespective of the orientation at which the sensor covers 320 are mounted to the side body 30.

In addition, as illustrated in FIG. 6, the side body 30 may have openings 330 formed therein, each of which is located at a position corresponding to a corresponding obstacle sensor 340 and a corresponding sensor cover 320.

That is, each of the openings 330 may be interposed between a corresponding obstacle sensor 340 and a corresponding sensor cover 320.

Accordingly, each of the obstacle sensors 340 may emit and receive a signal (for example, infrared light) for detecting external obstacles through a corresponding opening 330 and a corresponding sensor cover 320.

In other words, the infrared light generated from the light-emitting unit of each of the obstacle sensors 340 may be emitted outside after sequentially passing through a corresponding opening 330 and a corresponding sensor cover 320, and the infrared light reflected from an obstacle may be received by the light-receiving unit of each of the obstacle sensors 340 after sequentially passing through a corresponding sensor cover 320 and a corresponding opening 330.

The side body 30 may be formed in a hollow ring shape, which has open top and bottom ends and a predetermined height. For example, the side body 30 may be formed in a flat hollow cylindrical shape or a hollow prismatic shape.

The side body 30 may include an inner surface, which faces the interior of the robot cleaner 1, and an outer surface, which faces the exterior of the robot cleaner 1.

It is preferable for the distance between the center in the radial direction of the side body 30 and the outer surface of the side body 30 to be larger than the distance between the center in the radial direction of the side body 30 and the outer surface of each of the sensor covers 320.

In other words, each of the sensor covers 320 may be arranged to be stepped inwards from the outer surface of the side body 30 in the radial direction of the side body 30.

In more detail, each of the sensor covers 320 may be arranged such that the outer surface of each of the sensor covers 320 is stepped toward the interior of the robot cleaner 1 from the outer surface of the side body 30.

Accordingly, the sensor covers 320 may be prevented from directly bumping against obstacles outside the robot cleaner 1. In addition, the sensor covers 320 may be prevented from being scratched.

The side body 30 may further include first coupling portions 331, to which the obstacle sensors 340 are coupled, and second coupling portions 332, to which the sensor covers 320 are coupled.

Each of the first coupling portions 331 may have a coupling protrusion 331', and each of the obstacle sensors 340 may have a coupling recess 341, to which a corresponding first coupling portion 331 is coupled. That is, the coupling protrusion 331' of each of the first coupling portion 331 may be fitted into the coupling recess 341 of a corresponding obstacle sensor 340.

The obstacle sensors 340 may be assembled with the side body 30 toward the exterior in the radial direction of the side body 30 from the interior in the radial direction of the side body 30.

The second coupling portions 332 may be formed in the side body 30 at positions further radially outward than the first coupling portions 331.

Accordingly, when the obstacle sensors 340 and the sensor covers 320 are coupled to the side body 30, the sensor covers 320 may be disposed to cover the front surfaces of the respective obstacle sensors 340.

In addition, the sensor covers 320 may be removably coupled to the second coupling portions 332 in a slide-coupling manner. Accordingly, the coupling and removal of the sensor covers 320 to/from the side body 30 may be facilitated, which leads to easy replacement of the sensor covers 320.

In detail, each of the second coupling portions 332 may be embodied as a slit, which extends in a vertical direction. As an example, each of the second coupling portions 332 may be formed to extend in the vertical direction of the side body 30 in the middle in the thickness direction of the side body 30.

Each of the sensor covers 320 may have an edge portion 322, which is formed in at least one of two opposite side surfaces in the width direction of the sensor cover 320 so as to be inserted into a corresponding second coupling portion 332. As an example, the edge portion 322, which is formed to be inserted into a corresponding second coupling portion 332, may be formed in both side surfaces in the width direction of the sensor cover 320.

In other words, the second coupling portions 332 may be formed by partially cutting the side body 30 in the vertical direction. The sensor covers 320 may be coupled or removed to/from the side body 30 in a manner such that the edge portion 322 of each of the sensor covers 320 slides along a corresponding second coupling portion 332.

Therefore, the sensor covers 320 and the side body 30, which are formed of different materials from each other, may be separately manufactured, and may then be easily coupled to each other.

In addition, since the size of each of the sensor covers 320 is limited to the size that is capable of just barely covering the front surface of a corresponding obstacle sensor 340, an increase in cost attributable to the sensor covers 320, which are formed of a relatively expensive material, may be minimized.

In addition, since only the sensor covers 320 are treated with UV coating, the UV coating process may be facilitated, and the cost of UV coating may be reduced.

Hereinafter, the operational relationship of the components, which are controlled by the control unit C, in the robot cleaner 1 according to the embodiment of the present invention will be explained with reference to other drawings.

FIG. 7 illustrates a block diagram of the components connected with the control unit of the present invention.

Referring to FIG. 7, the above-described control unit C may be electrically connected with the obstacle sensors 340, the first camera 210, and the second cameras 310 so as to control the obstacle sensors 340, the first camera 210, and the second cameras 310 respectively.

The control unit C may also be electrically connected with the first motor m, the second motors M, and the suction device 430 so as to control the first motor m, the second motors M, and the suction device 430 respectively.

For example, when a user inputs an operation signal to the robot cleaner 1, the control unit C may control the suction device 430 and the first motor m so that the suction device 430 and the first motor m are driven to suck foreign substances on the floor into the robot cleaner 1.

In addition, when the images captured by the first camera 210 are transmitted to the control unit C, the control unit C may detect the position of the robot cleaner 1 based on the images captured by the first camera 210.

In addition, based on the signals from the obstacle sensors 340 and the images captured by the first camera 210, the control unit C may selectively drive the second motors M, which are connected to the two driving wheels 411 and 412 respectively.

In addition, the control unit C, which includes the communication module (not illustrated), may receive the images captured by the second cameras 310, and may transmit the images to an external terminal S. For example, the control unit C may transmit the images captured by the second cameras 310 to the external terminal S only when the control unit C receives an image transmission request from the external terminal.

INDUSTRIAL APPLICABILITY

The present invention provides a robot cleaner that is capable of preventing an obstacle sensor from malfunctioning and improving the precision of obstacle detection.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A robot cleaner comprising:
a main body defining an outer appearance thereof;
a suction device provided inside the main body;
a suction port for sucking foreign substances on a floor upon operation of the suction device;
a dust collection device for collecting foreign substances from air sucked through the suction port;
one or more wheels for enabling the main body to travel autonomously; and
a control unit for controlling operation of the suction device and the wheels,
wherein
the main body includes an upper housing and a lower housing, the upper housing and the lower housing being coupled to each other, and a side body interposed between the upper housing and the lower housing to surround a side portion of the main body, the side body being mounted with one or more obstacle sensors,
one or more sensor covers are removably mounted to the side body at positions corresponding to the one or more obstacle sensors, and
each of the sensor covers includes a front surface and a rear surface, the front surface and the rear surface being symmetrical with each other, and all surfaces of each of the sensor covers being treated with UV coating.

2. The robot cleaner according to claim 1, wherein each of the sensor covers is formed to have a size sufficient to cover a front surface of a corresponding one of the obstacle sensors.

3. The robot cleaner according to claim 2, wherein each of the sensor covers has a height less than or equal to a height of the side body, and has a width less than or equal to one-twentieth of a circumference of the side body.

4. The robot cleaner according to claim 1, wherein the side body and the sensor covers are formed of different materials from each other.

5. The robot cleaner according to claim 4, wherein the side body and the sensor covers are manufactured separately, and the sensor covers are removably mounted to the side body at positions in front of the obstacle sensors.

6. The robot cleaner according to claim 4, wherein the side body is mounted with one or more camera modules, the camera modules facing a region ahead of the robot cleaner, and the side body is formed of a semi-transparent material.

7. The robot cleaner according to claim 4, wherein each of the obstacle sensors includes an infrared sensor, and the sensor covers are formed to block light other than infrared light.

8. The robot cleaner according to claim 7, wherein the sensor covers are formed of polycarbonate.

9. The robot cleaner according to claim 8, wherein
the side body has openings formed therein, each of the openings being located at a position corresponding to a corresponding one of the obstacle sensors and a corresponding one of the sensor covers, and
each of the obstacle sensors emits and receives a signal for detecting external obstacles through a corresponding one of the openings and a corresponding one of the sensor covers.

10. The robot cleaner according to claim 1, wherein the side body is formed in a hollow ring shape having open top and bottom ends and a predetermined height.

11. The robot cleaner according to claim 10, wherein a distance between a center in a radial direction of the side body and an outer surface of the side body is larger than a distance between the center in the radial direction of the side body and an outer surface of each of the sensor covers.

12. The robot cleaner according to claim 11, wherein each of the sensor covers is arranged to be stepped inwards from the outer surface of the side body in the radial direction of the side body.

13. The robot cleaner according to claim 10, wherein the side body includes first coupling portions for coupling the obstacle sensors thereto, and second coupling portions for coupling the sensor covers thereto, and
the second coupling portions are formed in the side body at positions further radially outward than the first coupling portions.

14. The robot cleaner according to claim 13, wherein each of the first coupling portions has a coupling protrusion, and each of the obstacle sensors has a coupling recess, the coupling protrusion being fitted into the coupling recess, and
each of the sensor covers is removably coupled to a corresponding one of the second coupling portions in a slide-coupling manner.

15. The robot cleaner according to claim 14, wherein each of the second coupling portions is formed in a slit shape extending in a vertical direction, and
each of the sensor covers has an edge portion formed in at least one of two opposite side surfaces in a width direction of the sensor cover, the edge portion being inserted into a corresponding one of the second coupling portions.

16. A robot cleaner comprising:
a main body defining an outer appearance thereof;
a suction device provided inside the main body; and
one or more obstacle sensors provided in the main body,
wherein one or more sensor covers are removably mounted to the main body at positions corresponding to the one or more obstacle sensors, and
wherein each of the sensor covers includes a front surface and a rear surface, the front surface and the rear surface being symmetrical with each other, and all surface of each of the sensor covers being treated with an ultraviolet UV coating.

17. The robot cleaner according to claim 16, wherein a side body of the main body and the sensor covers are formed of different materials from each other, the side body and the sensor covers are manufactured separately, and the sensor covers are removably mounted to the main body at positions in front of the obstacle sensors.

18. The robot cleaner according to claim 16, wherein the main body includes
an upper housing and a lower housing, the upper housing and the lower housing being coupled to each other, and a side body interposed between the upper housing and the lower housing to surround a side portion of the main body, the side body being mounted with the obstacle sensors, and each of the sensor covers is arranged to be stepped inwards from the outer surface of the side body in the radial direction of the side body.

19. The robot cleaner according to claim 18, wherein a distance between a center in a radial direction of the side body and the outer surface of the side body is larger than a distance between the center in the radial direction of the side body and an outer surface of each of the sensor covers.

\* \* \* \* \*